(12) United States Patent
Unseld et al.

(10) Patent No.: US 6,712,364 B2
(45) Date of Patent: Mar. 30, 2004

(54) CYLINDER HEAD GASKET

(75) Inventors: Gunther Unseld, Neenstetten (DE); Josef Ludwig, Niederstotzingen (DE); Stefan Obermaier, Rorschach (CH)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 10/013,590

(22) Filed: Dec. 11, 2001

(65) Prior Publication Data

US 2002/0079651 A1 Jun. 27, 2002

(30) Foreign Application Priority Data

Dec. 12, 2000 (DE) ..................................... 200 21 017 U

(51) Int. Cl.⁷ ............................................... F02F 11/00
(52) U.S. Cl. ..................... 277/592; 277/593; 277/594
(58) Field of Search ..................................... 277/591–6

(56) References Cited

U.S. PATENT DOCUMENTS

| | | | | |
|---|---|---|---|---|
| 1,814,283 A | * | 7/1931 | Braner | 277/592 |
| 1,851,948 A | * | 3/1932 | Summers | 277/606 |
| 3,053,544 A | * | 9/1962 | Gorsica | 277/593 |
| 3,352,564 A | * | 11/1967 | Johnson | 277/593 |
| 3,843,141 A | * | 10/1974 | Kuhn | 277/595 |
| 4,203,608 A | * | 5/1980 | Nicholson | 277/595 |
| 4,387,904 A | * | 6/1983 | Nicholson | 277/595 |
| 4,468,044 A | * | 8/1984 | Ulmer et al. | 277/596 |
| 4,676,515 A | * | 6/1987 | Cobb | 277/592 |
| 4,728,110 A | * | 3/1988 | Nakasone | 277/595 |
| 4,750,749 A | * | 6/1988 | Nicholson | 277/595 |
| 4,898,396 A | * | 2/1990 | Udagawa | 277/592 |
| 4,976,445 A | * | 12/1990 | Udagawa | 277/595 |
| 4,995,624 A | * | 2/1991 | Udagawa et al. | 277/595 |
| 5,169,163 A | * | 12/1992 | Udagawa et al. | 277/593 |
| 5,232,229 A | * | 8/1993 | Udagawa | 277/595 |
| 5,306,024 A | * | 4/1994 | Udagawa | 277/592 |
| 5,626,348 A | * | 5/1997 | Takada et al. | 277/593 |
| 5,639,101 A | * | 6/1997 | Tanaka et al. | 277/593 |
| 5,664,790 A | * | 9/1997 | Tanaka et al. | 277/595 |
| 5,791,659 A | * | 8/1998 | Takada et al. | 277/593 |
| 5,876,038 A | | 3/1999 | Bohm et al. | |
| 6,036,195 A | * | 3/2000 | Udagawa | 277/595 |
| 6,089,572 A | * | 7/2000 | Plunkett | 277/592 |
| 6,206,381 B1 | * | 3/2001 | Ii et al. | 277/595 |
| 6,328,314 B1 | * | 12/2001 | Jinno et al. | 277/593 |
| 6,478,307 B2 | * | 11/2002 | Sugimoto et al. | 277/592 |

FOREIGN PATENT DOCUMENTS

| | | |
|---|---|---|
| DE | 195 15 329 C1 | 4/1995 |
| EP | 0866245 A2 * | 9/1998 |

OTHER PUBLICATIONS

Derwent English abstract of DE 195 15 329 C1. The U.S. Patent is related to DE 195 15 329 C1.

\* cited by examiner

*Primary Examiner*—Anthony Knight
*Assistant Examiner*—Alison K. Pickard
(74) *Attorney, Agent, or Firm*—Rader, Fishman & Grauer, PLLC

(57) ABSTRACT

The invention concerns a cylinder head gasket for sealing the region between cylinder head and a cylinder block having a cylinder liner of an internal combustion engine, comprised of at least one sealing sheet that has at least one combustion chamber passage opening and a combustion chamber crimp running around the combustion chamber passage opening, where a stop serving as a path limiter for the combustion chamber crimp is provided on the side of the combustion chamber crimp facing away from the combustion chamber passage opening and which stop encloses the combustion chamber crimp laterally, where at least one sealing sheet has at least two concentric combustion chamber crimps, which are enclosed laterally by the stop.

16 Claims, 4 Drawing Sheets

(Cut A-A)

(Cut A-A)

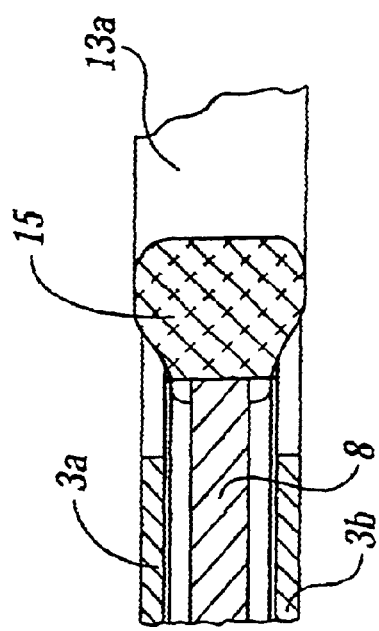
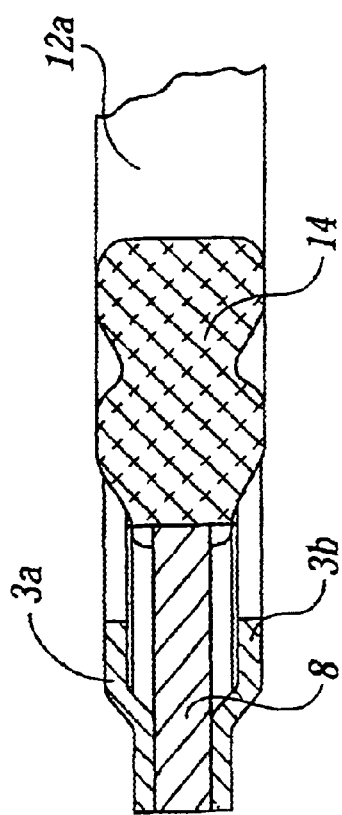
FIG. 3B (Cut C-C)
FIG. 3A (Cut B-B)

CYLINDER HEAD GASKET

CROSS REFERENCE TO RELATED APPLICATIONS

This application claims the benefit of German Application No. 200 21 017.3, filed Dec. 12, 2000, the complete disclosure of which is incorporated herein by reference.

FIELD OF THE INVENTION

The present invention concerns a cylinder head gasket for sealing the region between the cylinder head and a cylinder block having a cylinder lining of an internal combustion engine.

BACKGROUND OF THE INVENTION

Modern internal combustion engines increasingly have cylinder blocks of several components, in which, e.g., gray cast iron cylinder liners are cast or inserted into an aluminum block. This mode of construction also imposes new demands on a cylinder head gasket.

The rigidity of the engine with this modern construction is usually less than with a gray cast iron block such that distortions can occur more readily in the engine, which can also have an unfavorable effect on the seal between cylinder block and cylinder head.

Furthermore, especially with inserted cylinder liners, a relative movement between cylinder liner and the rest of the engine block cannot be excluded completely. Especially when the cylinder head is bolted on the cylinder block, the cylinder head gasket is subjected to a high pressure in the region around the combustion chamber passage opening to achieve a high surface compression. If this pressure is not distributed completely uniformly over the periphery of the cylinder, undesirable tilting moments or minor dislocations of the cylinder liner can take place relative to the rest of the cylinder block.

These effects require a cylinder head gasket whose combustion chamber-side seal functions flawlessly also with distortions, dimensional irregularities or improper handling.

DE 195 15 329 C1 shows a cylinder head gasket for sealing the region between cylinder head and the cylinder block of an internal combustion engine having a cylinder liner. It has two metal sealing sheets with an intermediate spacer sheet, where the metal sealing sheets have a combustion chamber crimp running around the combustion chamber passage openings. A stop serving as a path limiter for the combustion chamber crimps is provided on the side of the combustion chamber crimps facing away from the combustion chamber passage opening.

A movement or the introduction of unfavorable tilting moments should be prevented in that the cylinder liners have a peripheral outer edge at their cylinder head-side end, with which they are supported in a complementary recess of the cylinder block. In the case of dimensional irregularities of this expensive arrangement or distortions of the engine block, however, the sealing action of the combustion chamber crimps can be inadequate.

SUMMARY OF THE INVENTION

Based on this prior art, the goal of the present invention is to offer a cylinder head gasket that assures a permanently optimal sealing of the combustion chamber in interaction with the cylinder head, cylinder liner and the rest of the cylinder block.

This goal is achieved by a cylinder head gasket according to claim 1. Due to the fact that a sealing sheet has at least two concentric combustion chamber crimps, which are enclosed laterally by the stop, two subordinate protective dams are available in the radial direction, which can offer better height compensation and thus an improved sealing action in the case of a tilting of the cylinder liner relative to the engine block or a distortion of the engine block.

Particularly advantageous variants of the invention are shown in the dependent claims.

A particularly advantageous variant provides that the stop be designed as a thickening of the spacer sheet wherein the spacer sheet is located in the region of the combustion chamber passage opening essentially radially flush with the sealing sheet and the thickening relative to the combustion chamber passage opening is located on the side facing away from the concentric combustion chamber crimps.

It is particularly advantageous to design the stop additionally as a filled support crimp. The crimp cavity is filled here with an elastic-plastically deformable material, perhaps a hard-coating material. Such a support crimp, which is located in a power by-pass to the combustion chamber crimps, has the advantage according to the invention that relative movements can be made more difficult and leaks avoided. The filling of the support crimp, which is pressed on the lower sealing sheet or parts of the cylinder block when the cylinder head gasket is tightened down, serves as an additional seal. Such a seal is also adequate for the high pressures and long-term stresses of a truck Diesel engine.

Another advantageous variant provides that the cylinder head gasket be designed as a multilayer steel gasket with two sealing sheets and the spacer sheet between them, where all three layers have passage openings in alignment for water, oil, etc., and the spacer sheet has a sealing element of an elastomer around the throughflow opening. A secure seal that can be cost-favorably produced is thus made available for the throughflow openings for cooling water or oil with the remaining pressure of the cylinder head gasket, which was not consumed by the region around the combustion chamber passage openings.

A thickening containing an elastomer can be placed in the outer peripheral zone of the sealing sheet and be used as another advantageous variant, or a peripheral crimp as another variant.

BRIEF DESCRIPTION OF THE DRAWINGS

Additional advantageous variants are given in the dependent claims.

The present invention is explained by means of several figures.

FIGS. 3a and 3b shows sections through throughflow openings according to B—B and C—C in FIG. 1.

DETAILED DESCRIPTION OF THE INVENTION

Figure 1:
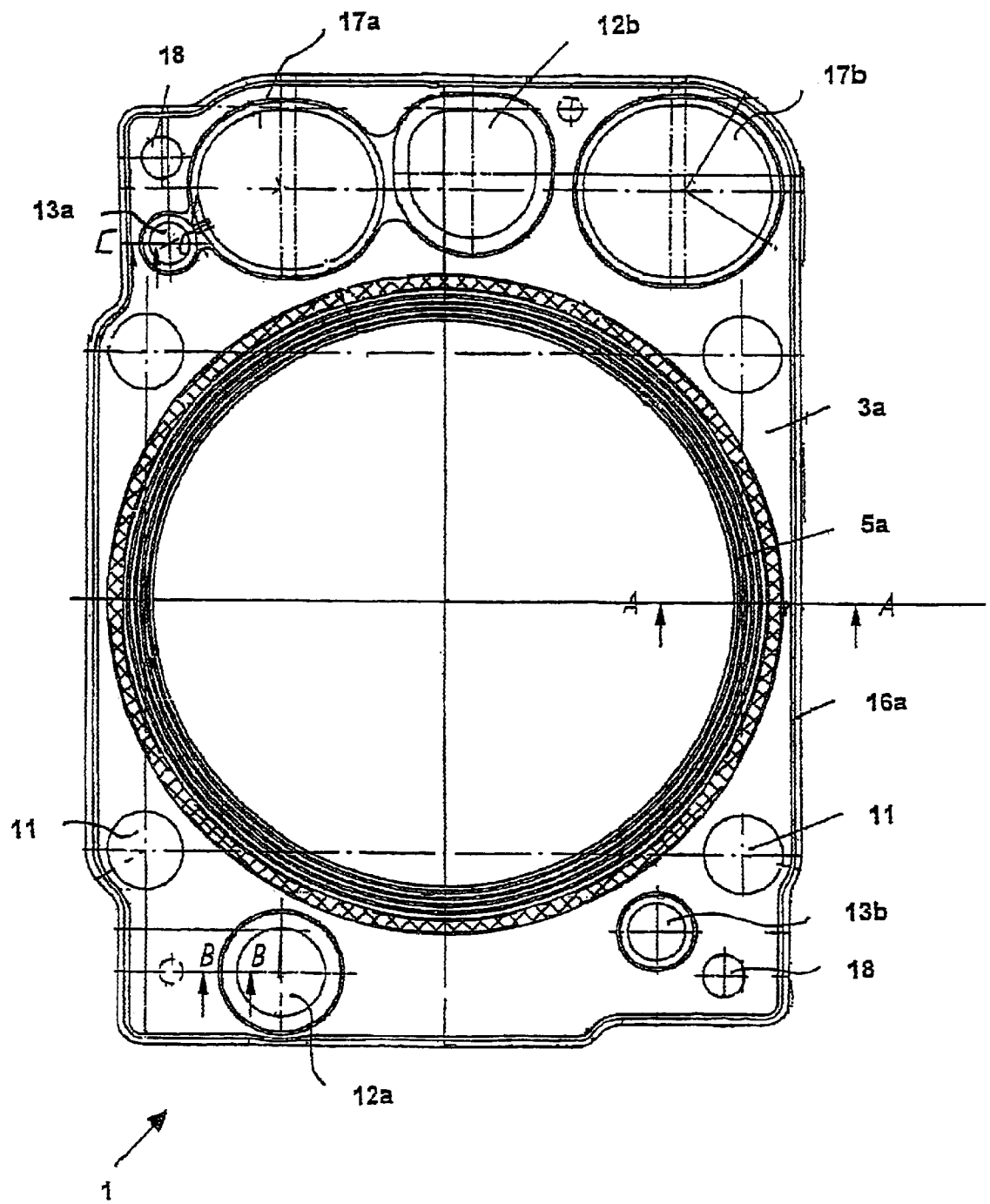
FIG. 1 shows a top view of a cylinder head gasket according to the invention.

FIG. 1 shows the top view of a cylinder head gasket according to the invention for sealing the region between the cylinder head and a cylinder block having a cylinder liner of an internal combustion engine. The top view shows an upper sealing sheet 3a that has a combustion chamber passage opening 4 and combustion chamber crimps running around the combustion chamber passage opening. These crimps are edged full crimps (reference is made to FIG. 2 for their more detailed construction). The cylinder head gasket depicted is a single-cylinder gasket, i.e., the cylinder head gasket contains only one combustion chamber passage opening. Of course, it is also possible to provide a cylinder head gasket according to the invention that covers several combustion chamber openings. Besides the combustion chamber passage opening, the cylinder head gasket has several other openings. Besides the center holes 18, they are passage openings for tappets 17a and 17b as well as for inlet and outlet openings for water 12a and 12b and for oil 13a and 13b. The cylinder head gasket shown is particularly well suited for use in heavy-duty Diesel engines for trucks, which are equipped with cylinder liners. However, the application range can be extended to automobiles as well as gasoline engines.

The precise construction of the cylinder head gasket is evident from the sectional representations.

Figure 2:
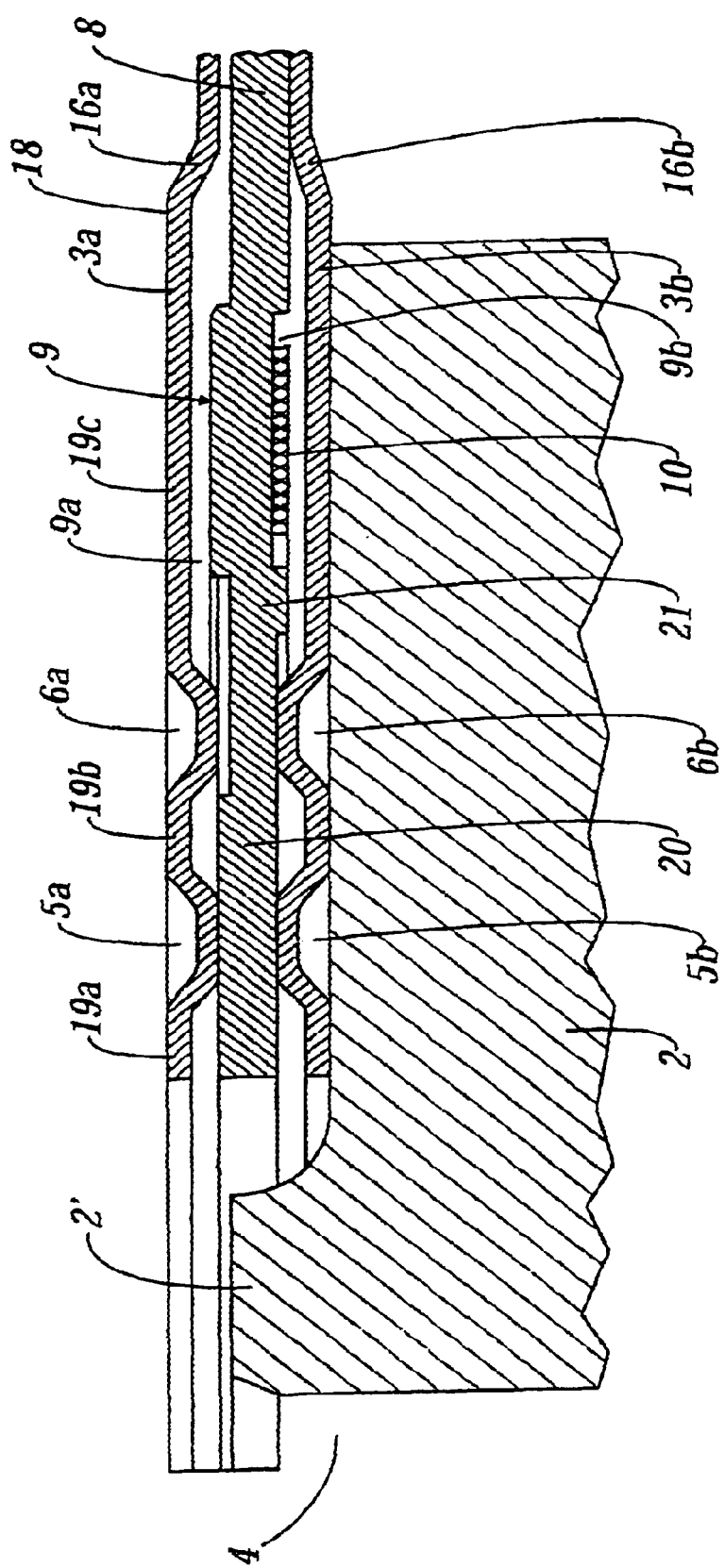
FIG. 2 shows a section of the cylinder head gasket from FIG. 1 along A—A.

FIG. 2 shows a section of FIG. 1 along A—A. This shows a cutout of an essentially hollow-cylindrical cylinder liner 2 with a cutout of the cylinder head gasket according to the invention. The rest of the cylinder block (not shown) is connected laterally to the cylinder head gasket. The latter is a multilayer steel gasket (MLS) with an upper metal sealing sheet 3a, a lower metal sealing sheet 3b and a spacer sheet 8 between them. The sealing sheets 3a and 3b are essentially mirror-symmetric. The upper sealing sheet 3a will thus be primarily referred to in the following. Beginning from the combustion chamber passage opening 4 in the radial direction outward and behind a combustion chamber elevation 2' of the cylinder liner 2, it has an uncrimped section 19a. Two concentric crimps 5a and 6a, which are spaced by an uncrimped section 19b, adjoin it. An uncrimped section 19c, which is located above a stop 9 of the spacer sheet 8, also adjoins this. A half-crimp 16a on the edge, whose marginal surface section lies on the edge of the spacer sheet 8 and ends flush with it, forms the termination of the spacer sealing sheet 3a.

The spacer sheet 8 is located underneath the upper sealing sheet 3a. It has openings matching the openings of the sealing sheets 3a and 3b so that the spacer sheet 8 also ends up flush with the sealing sheets in the radial direction relative to the combustion chamber passage opening 4. Beginning in the radial direction from the inside, a region of constant thickness with a high surface quality first extends in the contact region 20 with the crimps 5a, 5b and 6a, 6b. A thickened section opposite the contact zone, which section serves as the path limiter for the vertical deformation of the combustion chamber crimps, a stop 9, connects to it after a transition zone 21. It encloses the combustion chamber crimps on the radially outer side relative to the two concentric combustion chamber crimps of the combustion chamber passage opening 4. The stop 9 is a filled support crimp. With this stop construction, the combustion chamber crimps are pressed in force by-pass and the crimps cannot thus be compressed completely flat if a vertical force is applied on the multilayer steel gasket by cylinder head bolts (not shown), which pass through the openings 11 (see FIG. 1).

The support crimp has an upper convexity 9a and a lower recess 9b. The lower recess 9b is provided with a filling of a hardcoating material. This material is compressible and gas-tight. It can be produced, e.g., from a composite of a synthetic resin and a metal powder, as described in DE 199 28 580. It can be produced very cost-favorably because the composite material can be sprayed or pressed into the recess 9d in a circular manner. Fillers containing minerals, such as ceramics, can also be used.

The support crimp according to the invention has the advantage that the good height compensation of the cylinder head gasket according to the invention and a good sealing action are supported by the stop acting as a support crimp. During the compression of the multilayer steel gasket, the upper sealing sheet 3a presses on the convexity 9a so that the support crimp 9 bulges out somewhat downward so that the hardcoating material 10 is pressed with a high pressure on the upper side of the lower sealing sheet 3b so that a plastic-elastic bond is formed that assures a very good gas seal despite a residual moveability.

The overall seal can also be further improved in that the sealing sheets 3a and 3b are preferably provided on both sides and above all in the zone of contact with the spacer sheet 8 with an elastomer coating 18.

Radially outside the filled support crimp 9, a section of constant thickness of the spacer sheet 8 is connected, which terminates laterally with the gasket sheets 3a and 3b; the sealing off in the edge zone is done by semibeads 16a and 16b of the sealing sheets 3a and 3b, which assures that the sealing sheets in the edge zone lie flat on the spacer sheet 8.

FIG. 3a shows a section along B—B from FIG. 1. It shows the cutout around the throughflow opening 12a for liquid media, e.g., for water. The spacer sheet 8 includes a sealing element 14 concentric to the passage opening 12a. This sealing element is preferably of an elastomer (e.g., fluoroelastomer (FPM) or methyl-vinyl silicone (MVQ)) and may also be reinforced with metal. To obtain a better seal, the essentially annular sealing element 14 has two concentric sealing lips that are concentric to the passage opening 12a. The sealing element has a greater height in the unpressed state of the cylinder head gasket than the highest height of the lamination of sealing sheets 3a and 3b and the spacer sheet 8. To prevent a pushing out of the sealing element material and to validate the sealing element, in the region of the passage opening 12a the opening diameter is larger in the sealing sheets 3a and 3b than in the spacer sheet 8.

FIG. 3b shows a section along C—C of the cylinder head gasket of FIG. 1. There is a throughflow opening for oil here. The construction is in accordance with the throughflow opening from FIG. 3a, but the sealing element is provided with only one sealing lip.

Figure 4:
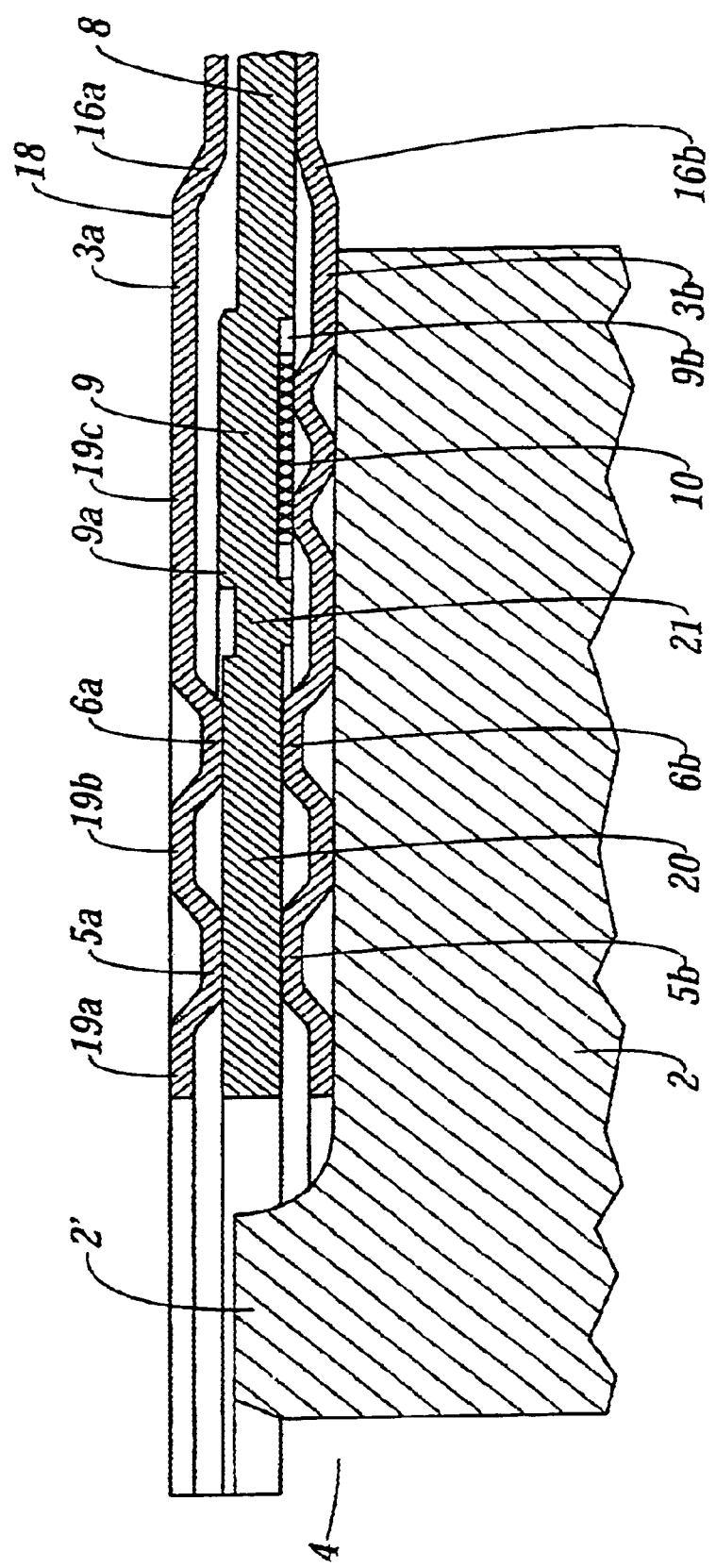
FIG. 4 shows another section of the cylinder head gasket from FIG. 1 along A—A.

Finally, FIG. 4 shows a section along A—A of the cylinder head gasket from FIG. 1. In contrast to FIG. 2, however, at least one of the sealing sheets (3a,3b) is undulated in the region of the stop (9) here. The other details of this figure match those of FIG. 2.

What is claimed is:

1. A cylinder head gasket for sealing a region between a cylinder head and a cylinder block of an internal combustion engine having a cylinder liner, comprising:
    at least one sealing sheet including at least on combustion chamber passage opening, and at least two combustion chamber crimps enclosing the passage opening; and
    a stop including a filled support crimp that includes a hardcoating material,
    wherein the at least two crimps are located between the passage opening and the stop, and
    wherein the stop encloses the at least two crimps.
2. The gasket of claim 1, wherein a spacer sheet includes the filled support crimp.

3. The gasket of claim 2, wherein the spacer sheet extends essentially the entire surface of the at least one sealing sheet not provided with openings.

4. The gasket of claim 2, wherein the at least one sealing and the spacer sheet further comprise at least one opening for the passage of liquid media.

5. The gasket of claim 4, wherein the at least one opening for the passage of liquid media further comprises an elastomeric sealing element.

6. The gasket of claim 1, wherein the at least one sealing sheet at least partially includes an elastomer coating.

7. The gasket of claim 1, wherein the at least one sealing sheet further comprises at least one opening for the passage of cylinder head bolts.

8. The gasket of claim 1, wherein the at least one sealing sheet further comprises an undulated region near the stop.

9. The gasket of claim 1, further comprising an edge crimp which encloses the stop.

10. A cylinder head gasket, comprising:
 at least two sealing sheets including at least one combustion chamber passage opening and at least two combustion chamber crimps enclosing the passage opening, and
 a spacer sheet located between the at least two sealing sheets, wherein the spacer sheet includes a filled support crimp which encloses the at least two combustion chamber crimps,
 wherein the at least two combustion chamber crimps are located between the passage opening and the filled support crimp and wherein the filled support crimp includes a hardcoating material.

11. The gasket of claim 10, further comprising an edge crimp which encloses the filled support crimp.

12. The gasket of claim 10, further comprising an elastomer coating.

13. The gasket of claim 12, wherein the elastomer coating is at least located between the filled support crimp and at least one of the sealing sheets.

14. The gasket of claim 10, wherein the at least one sealing sheet and the spacer sheet further comprise at least one opening for the passage of liquid media.

15. The gasket of claim 14, wherein the at least one opening for the passage of liquid media further comprises an elastomeric sealing element.

16. A cylinder head gasket, comprising:
 at least two sealing sheets including at least one combustion chamber passage opening, at least two combustion chamber crimps enclosing the passage opening, and an edge crimp enclosing the at least two combustion chamber crimps, and
 a spacer sheet located between the at least two sealing sheets, wherein the spacer sheet includes a filled support crimp which is located between the at least two combustion chamber crimps and the edge crimp and wherein the filled support crimp includes a hardcoating material.

* * * * *

UNITED STATES PATENT AND TRADEMARK OFFICE
CERTIFICATE OF CORRECTION

PATENT NO.    : 6,712,364 B2
DATED         : March 30, 2004
INVENTOR(S)   : Gunther Unseld It is certified that error appears in the above-identified patent and that said Letters Patent is hereby corrected as shown below:

Column 4,
Line 58, please delete "on" and add -- one --

Signed and Sealed this

Thirteenth Day of July, 2004

JON W. DUDAS
*Acting Director of the United States Patent and Trademark Office*